(No Model.) 3 Sheets—Sheet 1.
J. A. CROCKER.
SYSTEM OF FILTRATION OF WATER FOR CITY OR TOWN SUPPLIES.
No. 426,988. Patented Apr. 29, 1890.
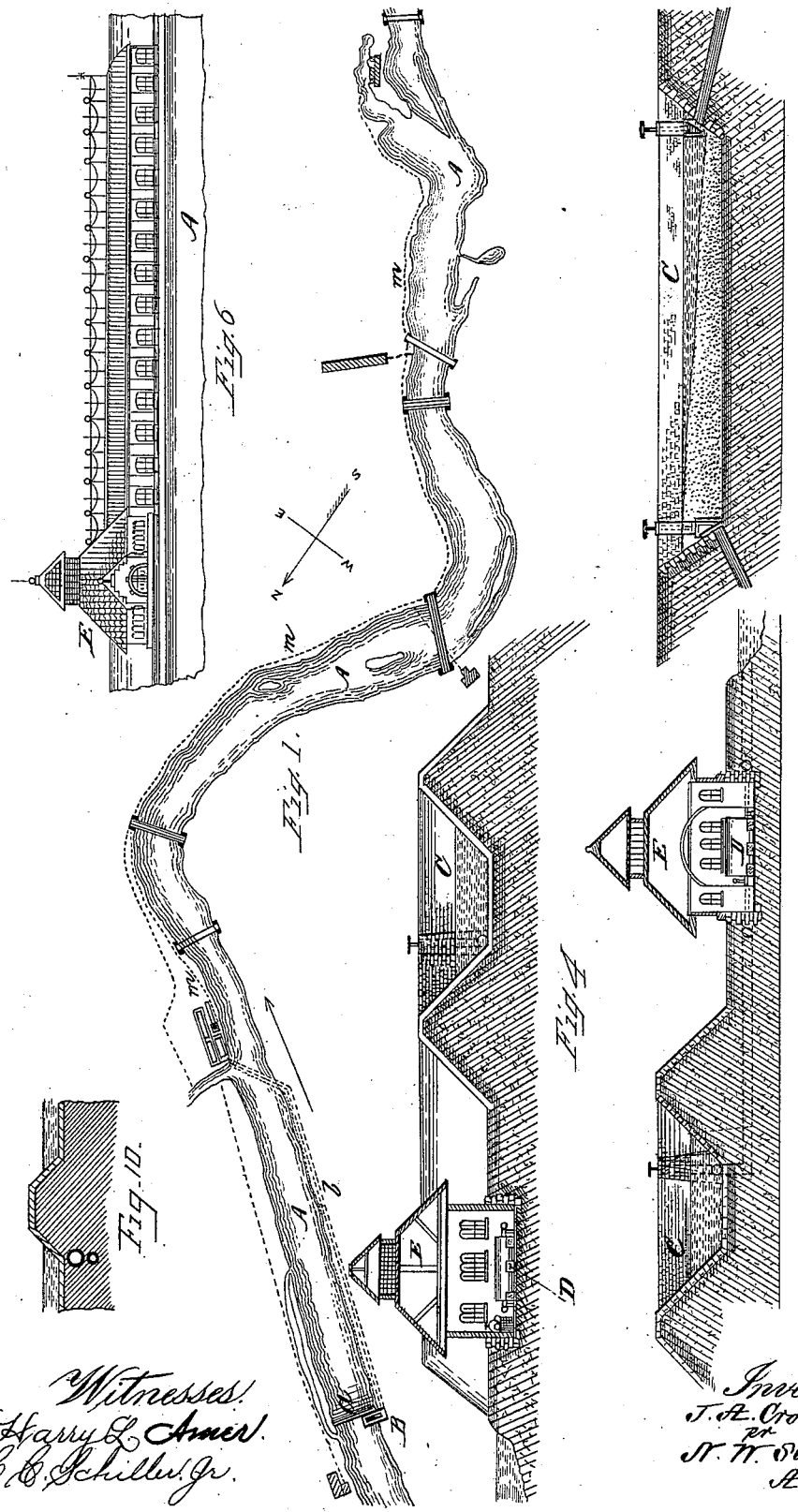

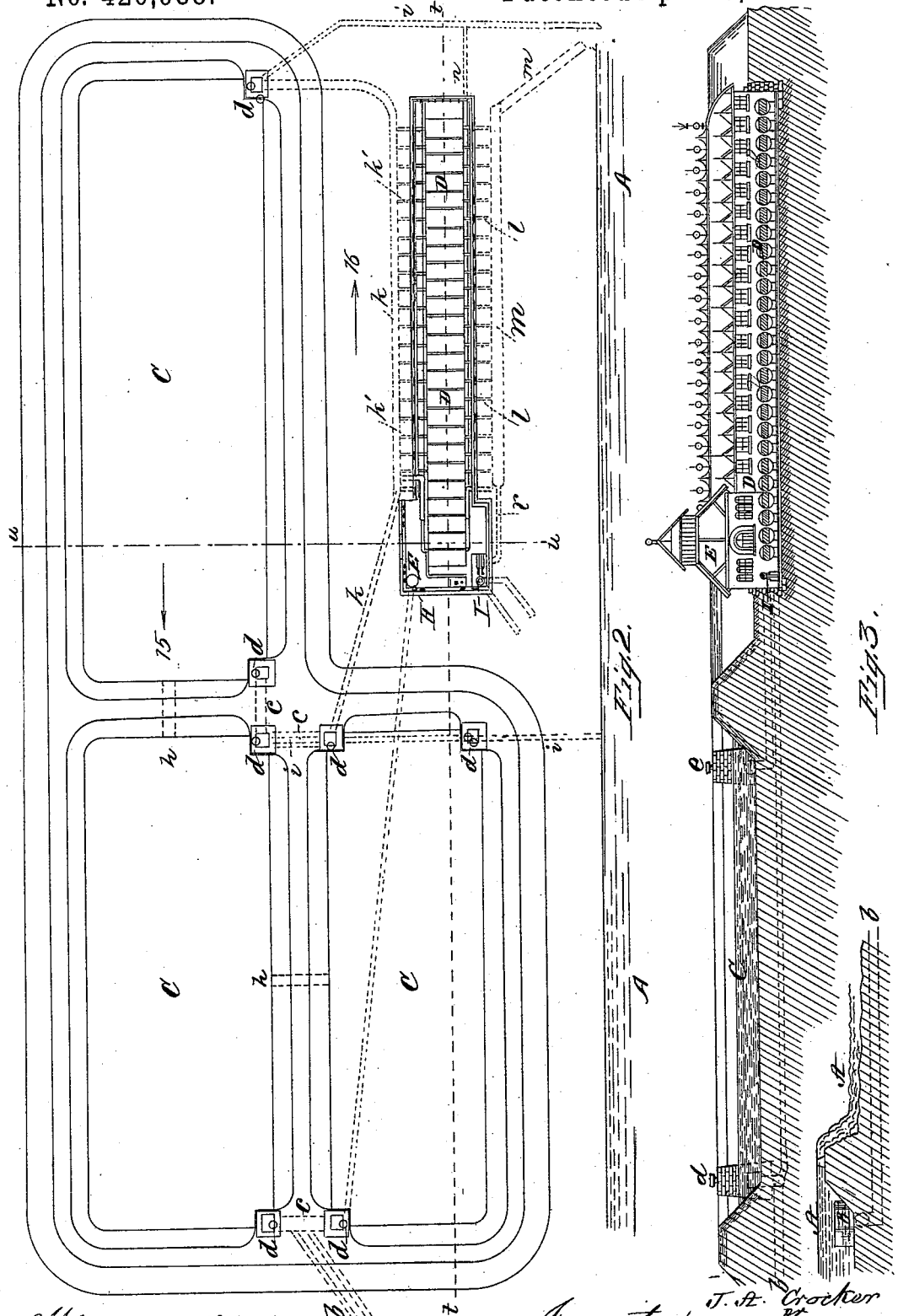

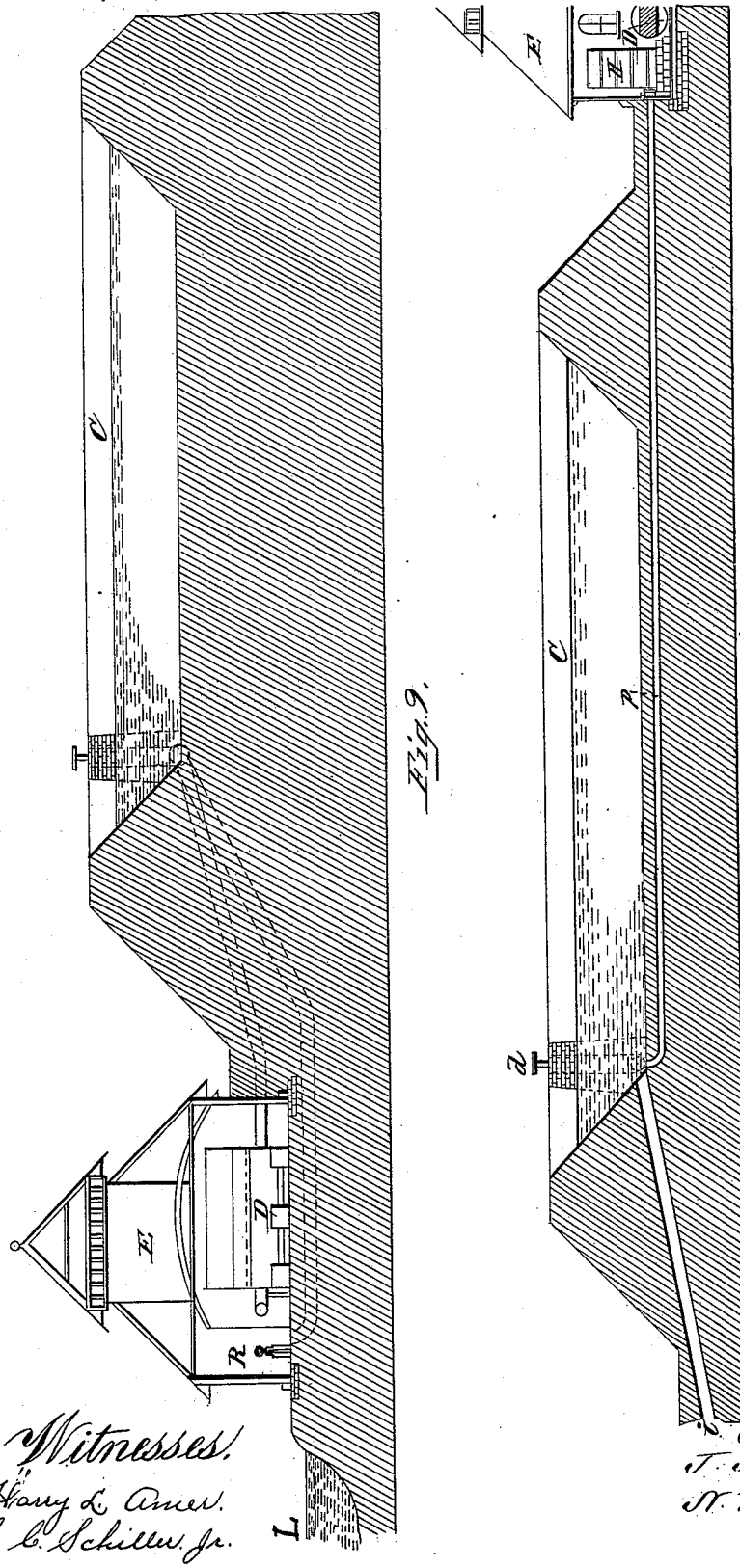

UNITED STATES PATENT OFFICE.

JAMES ALLEN CROCKER, OF BROOKLYN, NEW YORK, ASSIGNOR TO THE CROCKER FILTERING COMPANY OF NEW YORK.

SYSTEM OF FILTRATION OF WATER FOR CITY OR TOWN SUPPLIES.

SPECIFICATION forming part of Letters Patent No. 426,988, dated April 29, 1890.

Application filed December 26, 1889. Serial No. 334,909. (No model.)

*To all whom it may concern:*

Be it known that I, JAMES ALLEN CROCKER, of Brooklyn, Kings county, State of New York, have invented a System of Filtration of Water for City or Town Supplies, of which the following is a full, clear, and exact description, reference being had to the accompanying drawings, making part of this specification, in which—

Figure 1 is a plan of a portion of a river and my filtering plant located thereat. Fig. 2 is an enlarged plan showing a portion of a river with my filtering plant applied thereto and located in a position to receive the supply of water by the action of gravity. Fig. 3 is a vertical longitudinal section on the line $tt$ of Fig. 2, representing a dam of water, a basin connected therewith, a battery of filters, and the building in which the latter is located, together with supply-conduits and a precipitating-solution tank and its delivery-pipes. Fig. 4 is a transverse section on the line $uu$ of Fig. 2, looking in the direction of the arrow 15. Fig. 5 is a vertical transverse section on the line $uu$ of Fig. 2, looking in the direction of the arrow 16. Fig. 6 is an elevation of the building which extends over the filtering-battery, with the bank of a basin in its rear. Fig. 7 is an enlarged vertical section showing the precipitating-solution tank and its pipe leading to the supply-inlet of the precipitating-basin. Fig. 8 represents the manner of the deposition of sediment within a basin. Fig. 9 is a transverse section representing my system of filtration in which the water-supply, instead of being fed to the basin by gravity, is lifted thereto by pumps; Fig. 10, a detail to be referred to.

The purpose of my present invention is to afford a supply of pure filtered water for domestic and manufacturing uses of cities, towns, &c.; and my invention consists in an organized system in which the subsiding and precipitating basin or basins and the battery of filters bear peculiar relations to each other and to the supply and delivery and to the pumping, lifting, and distributing stations, and in which the inlet of a basin is at its bottom and its outlet near the surface of the water therein, with a maximum distance between them, in combination with the water-supply and the filtering plant, the several features being arranged in a manner hereinafter to be described.

To enable others skilled in the art to understand my invention, I will proceed to describe the method by which I have carried it out.

In Figs. 1 to 8, inclusive, of said drawings, which illustrate my gravity system, A represents a river, and $a$ a dam over which it falls. Above the dam and on the river-edge is a head-work or "crib" B of masonry, from the bottom of which runs a conduit or pipe $b$, leading underground to the bottom of one of a series of precipitating-basins C, the walls of which project above the level of the surface of the water on the dam to prevent overflow, the height of the surface of the water on the dam being the same as that in the basin with the exception of difference in fall which it takes to gravitate thereto. Two contiguous basins C C are connected at their bottoms by a pipe $c$, the ends of which are provided with gates $d$, to enable the water to flow from one basin to the other and to stop the water from entering one basin when it is to be isolated and emptied in order to cleanse the same. The inlet-pipe $b$ where it enters the basin is also controlled by one of the gates $e$ to cut off the supply of water thereto when desired. In the wall between two contiguous basins at a point just below its water-level is located a horizontal pipe $h$, through which flows the water from one basin to another. Each basin preferably has an inclined bottom, and leading to its lowest point is a washout-pipe $i$, by which the muddy accumulation is allowed to escape when desired. (See Fig. 10.)

D D D are a series (forming a battery) of filtering-machines, preferably of cylindrical form, arranged in a horizontal position parallel and near to each other, (see Fig. 2,) the battery of filters being covered by a building E, the top of the filtrant or filter-bed in the cylinders being on a level with the surface of the water in the river below the dam, the battery of filters, the building covering it, and the basins forming what I term the "mechanical filter plant."

The basin nearest the battery of filters is connected by a pipe $k$ therewith and inclining downward thereto, each cylinder being supplied by a separate pipe $k'$, leading from the pipe $k$ to conduct the water from the said basin to its center, which is located several feet below the water-level of the basin. At the opposite ends of the cylinders are small delivery-pipes $l$, (for the filtered water,) leading from their centers to a delivery-conduit $m$, extending to a pumping-station.

At the delivery end of each of the cylinders, and extending longitudinally with the plant, is a pipe $n$, (called the "cylinder washout-pipe,") for removing the accumulated sediment from the cylinders, each cylinder having an independent connection with said washout-pipe to allow of being cleansed independently of another. A pipe $r$ leads from the filtered delivery-pipe $m$ to a pump I, located in a corner of the building, for pumping the filtered water back through each cylinder separately to cleanse the same. (See Fig. 2.)

At a point within the building E and at its corner contiguous to the nearest basin is located a precipitating-solution tank H, from the bottom of which leads a pipe $p$ underground, through which flows the dissolved precipitant to the point where the river-water first enters the basin nearest it, by which much of its sediment is coagulated and deposited. (See Fig. 7.)

After the filtered water leaves the cylinders and is conducted to the pumping-stations it is raised by the pumps to the distributing-reservoirs connected therewith. By having an extended basin capacity and locating the inlet of the basin at the lowest point of its bottom at a distance farthest removed from the pipe which delivers the water to the cylinders and locating said delivery-pipe near the surface of the water in the basin the precipitant has a much longer time to act, and consequently has the ability of coagulating and depositing the maximum amount of sediment upon the bottom of the basin, the manner in which the same is deposited being somewhat as represented in Fig. 8. I find in practice that by the time the water leaves the outlet of the basin nearest the filtering plant only a small portion (say one-third of the sediment) is carried into the filtering-cylinders. Consequently (by treating the water as aforesaid) I require to employ only about one-third the number of cylinders which would be necessary were the water conducted directly from the supply in the river to the filtering plant. Referring to Fig. 9, L represents the level of the water in the river; E, the building covering the battery D of cylinders; C, the subsiding and precipitating basin, and R a pump located in the building for raising the water in the river to the basin. The water in the river is here represented as below the filtering-battery and the latter below the basin, the pumps being operated by steam or water, as economy would suggest.

At certain seasons of the year (when the water contains but little sediment) little or no precipitant is required, as the natural subsiding action will sufficiently accomplish the precipitation without it.

Among the advantages resulting from my improved system of filtration may be enumerated the following: As the water is delivered to the pumping-stations in a pure filtered state, no grit is carried into the pumps to damage them and the reservoirs and mains of the distribution system are free from sediment, so that the clogging and reduction of their effective capacity due to the accumulation of mud therein, as heretofore, (when the water was delivered to the pumping and distributing stations directly from the river,) is avoided.

I claim—

A water-supply, a battery of filters with a building thereover, one or more interposed precipitating-basins with their inlet and delivery pipes, a precipitating-solution tank located at a point in the building nearest the inlet of the basin-supply, the pipe connecting them, and one or more pumping, lifting, and reservoir distributing stations, with the pipes and conduits leading from the filtering-battery to said stations, all constructed to operate substantially in the manner and for the purpose set forth.

Witness my hand this 21st day of December, 1889.

JAMES ALLEN CROCKER.

In presence of—
N. W. STEARNS,
J. K. TILLEY.